W. L. HEADLY.
FLAT IRON STAND.
APPLICATION FILED MAR. 31, 1908.
918,148.  Patented Apr. 13, 1909.
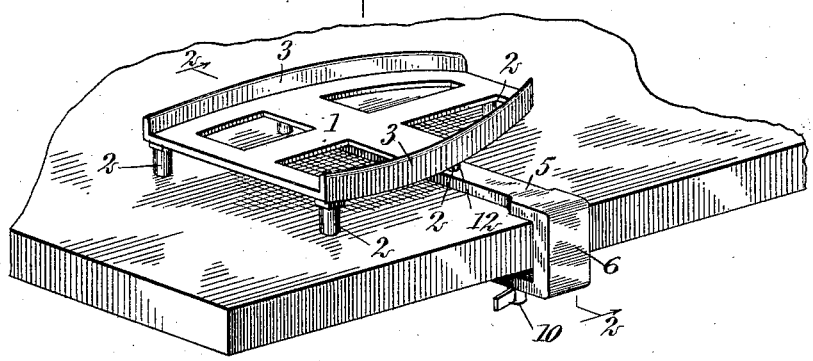
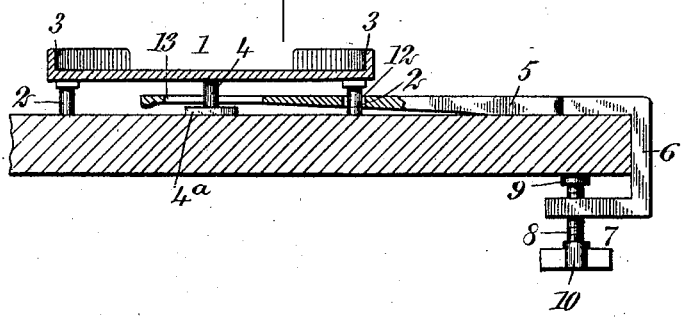
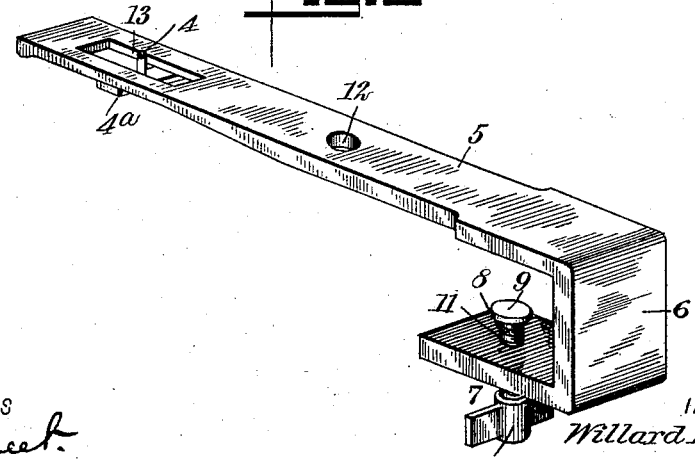
WITNESSES
INVENTOR
Willard L. Headly
BY
ATTORNEYS

UNITED STATES PATENT OFFICE.

WILLARD L. HEADLY, OF COLWYN, PENNSYLVANIA.

FLAT-IRON STAND.

No. 918,148.   Specification of Letters Patent.   Patented April 13, 1909.

Application filed March 31, 1908. Serial No. 424,432.

*To all whom it may concern:*

Be it known that I, WILLARD L. HEADLY, a citizen of the United States, and a resident of Colwyn, in the county of Delaware and State of Pennsylvania, have invented a new and Improved Flat-Iron Stand, of which the following is a full, clear, and exact description.

This invention relates to stands for flat irons or the like, and more particularly such stands as have removable means for securing them to the top of an ironing board, table or the like.

The object of this invention is to provide a simple, inexpensive and serviceable stand for irons or the like, which has a bracket for removably securing it to the top of a table or the like, and obviates the danger of the stand with the iron thereon being knocked off or turned over.

This invention consists in the construction and combination of parts to be more fully described hereinafter and particularly set forth in the claims.

Reference is to be had to the accompanying drawings forming a part of this specification in which similar characters of reference indicate corresponding parts in all the views, and in which—

Figure 1 is a perspective view of the device as applied to the edge of a table or board; Fig. 2 is a cross section on the line 2—2 of Fig. 1; and Fig. 3 is an enlarged perspective view of the clamping member.

Before proceeding to a more detailed description of my invention, it should be understood that I provide a stand for flat irons, sad irons or the like, having legs for supporting it on an ironing board or table, and having a clamping member for rigidly though removably holding the stand in position. The clamping member is readily adjustable to the edge of any board or table, and in supporting the stand, prevents the latter, especially when holding an iron, from being turned over or moving from the position in which it is held. The stand may be of any common or preferred form.

Referring more particularly to the drawings, I provide an iron stand 1 of any suitable material, such as cast metal or the like, and legs 2 for supporting the same. Flanges 3 on opposite sides of the stand serve to hold an iron thereon. A stud 4, substantially T-shaped, is located near the center of the stand at the under side thereof. The stud if necessary, may rest on the table and form an additional support. I further provide a clamping member 5 for removably securing the stand to the top of a table or ironing board. This member has a substantially U-shaped portion 6 at one end thereof for engaging the edge of the table or the like, and an adjustable clamp 7, comprising a threaded shank 8, a head 9 for engaging the under side of the table or board, and a manually operable grip 10, is arranged in a threaded opening 11 situated in the part of the clamping member which is located under the board or table when the clamping member is in position. The clamping member has an opening 12 for receiving one of the legs 2 of the stand. A slot 13 is located near the end of the clamping member remote from the end which carries the adjustable clamp 7, to receive the stud 4.

In mounting my device on an ironing board or table, the U-shaped end 6 of the clamping member is secured to the edge of the table by means of the adjustable clamp 7. The iron stand is then arranged so that one of the feet 2 is received by the opening 12, while the stud 4 is received by the slot 13. This removably secures the stand in position. The cross head 4ᵃ of the stud 4 is elongated to pass through the slot 13 when in a predetermined position relative thereto. The clamping member is upwardly inclined at the under side so that the end thereof remote from the table edge is spaced from the top of the table to permit the positioning under it of the cross head 4ᵃ. The stand and clamping member may be mounted on either side of a table. To reverse the stand, it is simply necessary to lift the stand and turn it until the foot 2 opposite to the one that has just been removed from the opening 12, engages the latter. Further, the stand, if necessary, may be detached from the clamping member to be used separately.

I do not limit myself to the exact construction shown, as others equally suitable may be employed without departing from the spirit of the invention.

Having thus described my invention, I claim as new and desire to secure by Letters Patent,—

1. In a device of the class described, a stand having legs, a substantially T-shaped stud near the center of said stand, a clamping member having a slot to receive said stud and a further opening to receive one of the legs of said stand, and adjustable means for securing said clamping member on a table.

2. In a device of the class described, a stand having legs, a stud near the center of said stand, a clamping member having a slot to receive said stud, a further opening to receive one of the legs of said stand, said clamping member having one end substantially U-shaped to receive the edge of a table, and an adjustable clamp for securing said clamping member in position.

In testimony whereof I have signed my name to this specification in the presence of two subscribing witnesses.

WILLARD L. HEADLY.

Witnesses:
W. L. HEADLY, Jr.
C. B. HEADLY.